(12) United States Patent
Zollondz et al.

(10) Patent No.: US 6,432,343 B1
(45) Date of Patent: Aug. 13, 2002

(54) PROCESS OF MANUFACTURING ROTATIONALLY SYMMETRICAL ARTICLES

(75) Inventors: Rüdiger Zollondz, Hornbach; Walter Wagner, Cham, both of (DE)

(73) Assignees: Mannesmann AG, Düsseldorf; Ensinger GmbH & Co., Nufringen, both of (DE)

( * ) Notice: Subject to any disclaimer, the term of this patent is extended or adjusted under 35 U.S.C. 154(b) by 0 days.

(21) Appl. No.: 09/501,250

(22) Filed: Feb. 10, 2000

(30) Foreign Application Priority Data

Feb. 12, 1999 (DE) .......................... 199 07 471

(51) Int. Cl.⁷ .................. B29C 39/08; B29C 39/10; B29C 70/08
(52) U.S. Cl. .................... 264/255; 264/265; 264/275; 264/308; 264/311
(58) Field of Search ................ 264/250, 255, 264/299, 310, 311, 259, 271.1, 275, 308, 162, 265; 474/161, 166, 192, 190

(56) References Cited

U.S. PATENT DOCUMENTS

| | | | |
|---|---|---|---|
| 3,978,181 A | * | 8/1976 | Vahle .................. 264/46.7 |
| 4,652,415 A | * | 3/1987 | Nguyen et al. ......... 264/275 |
| 5,728,343 A | * | 3/1998 | Ueno .................. 264/275 |
| 5,797,819 A | * | 8/1998 | Arai ................... 474/161 |
| 5,846,470 A | * | 12/1998 | Funatsu et al. ........ 264/271.1 |
| 5,980,796 A | * | 11/1999 | Nussdorfer et al. ..... 264/102 |
| 6,099,426 A | * | 8/2000 | Nakagomi et al. ...... 474/190 |
| 6,200,513 B1 | * | 3/2001 | Emmett ................ 264/320 |
| 6,270,001 B1 | * | 8/2001 | Tadic et al. .......... 228/245 |

FOREIGN PATENT DOCUMENTS

| | | |
|---|---|---|
| DE | AS 19 36 822 | 2/1971 |
| DE | 28 01 990 A1 | 7/1979 |
| DE | 44 27 206 A1 | 2/1996 |

OTHER PUBLICATIONS

Dubbel Handbook for the Mechanical Engineering, 18th ed., p. U9, chapter 2.2.3, entitled "Seilrollen und Seiltrommeln", W. Beitz and K. H. Küttner, Springer–Verlag, 1995.

Publication, "Plastics–Handbook", vol. VI, entitled "Polyamides", pp. 46 to 49, Prof.Dr.–Ing. E.h. Dr. Richard Vieweg and Dr. Alfred Müller, published by Carl Hanser Verlag, Munich 1996.

* cited by examiner

*Primary Examiner*—Angela Ortiz
(74) *Attorney, Agent, or Firm*—Henry M. Feiereisen

(57) ABSTRACT

In a process of making a rotationally symmetrical article, such as rope pulleys, running wheels or the like, from plastic material such as cast polyamides, raw material melts of plastic material and predetermined amounts of catalysts, activators and stabilizers are prepared at different formulation and composition to impart the melts with different mechanical strengths after polymerization. The raw material melts are poured into a heated, rotating mold in succession in dependence on a polymerization pattern of the raw material melts. After complete polymerization of the melts, the mold is opened, and the finished article can be removed from the mold for optional refinishing procedure.

23 Claims, 3 Drawing Sheets

PROCESS OF MANUFACTURING ROTATIONALLY SYMMETRICAL ARTICLES

CROSS-REFERENCES TO RELATED APPLICATIONS

This application claims the priority of German Patent Application Serial No. 199 07 471.2, filed Feb. 12, 1999, the subject matter of which is incorporated herein by reference.

BACKGROUND OF THE INVENTION

The present invention relates to a process of manufacturing rotationally symmetrical articles, such as rope pulleys, running wheels or the like, from plastic material, in particular cast polyamides.

In Dubbel "Handbook for the Mechanical Engineering, $18^{th}$ ed., page U9, chapter 2.2.3, entitled "Seilrollen und Seiltrommeln", reference is made to the provision of rope pulleys made from plastic material, preferably polyamide, for use in mobile cranes. According to another publication, "Plastics-Handbook", vol. VI, entitled "Polyamides", pages 46 to 49, published by Carl Hanser Verlag, a process is described in which a component A comprised of a catalyst-containing lactam melt, and a component B comprised of an activator-containing lactam melt are mixed and polymerized in a mold. After polymerization and crystallization, the solidified article is removed from the mold and, optionally, mechanically re-dressed. Examples for lactam include ε-caprolactam or C-substituted lactams.

Rotationally symmetrical articles, such as rope pulleys, rope sheaves, running wheels or the like are typically manufactured through a centrifugal casting process in which a heated mold rotates at high speed about a horizontal or vertical axis. Raw material melt is poured into the rotating mold and pushed by centrifugal forces against the mold wall to thereby prevent shrink holes and air pockets.

The use of rope pulleys or rope sheaves of plastic in crane construction is advantageous for several reasons: the rope is exposed to smaller loads as a consequence of the enhanced pressure distribution between rope pulley and rope, so that the rope is subjected to reduced wear and thereby accomplishes a significantly longer life. In addition, the manufacture of the rope pulley of plastic material results in weight and cost advantages.

A major problem facing the art in connection with the use of a rope pulley of plastic material is the load to which the hub area (bearing seat) is exposed. For cost reasons and spatial needs (width of the bearing), smallest possible compact bearings are used. At elevated temperatures, which in summer may rise in extreme cases up to 50° C., the modulus of elasticity of polyamide drops considerably (20° C.: 2800 $N/mm^2$; 50° C.: 1400 $N/mm^2$), so that the bearing seat begins to yield at the edge when the rope is pulled at a slant. This results in excessive pressure at the edge of the bearing seat. The slanted disposition of the rope pulley causes a shift of the load, thereby increasing the slanted pull until the rope pulley fails.

German Pat. No. 44 27 206 describes a fiber composite in the form of mats, rovings, fabric, dressing plate or needle felt, which is made of glass fibers or plastic fibers. The fiber composite is fixed in place in a mold before polymerization to realize defined deposits of the fiber composite in the finished article, thereby improving the mechanical properties. Practice has shown, however, that this process is highly uncertain and complicated. The polymerization is adversely affected by the ingress of moisture and the presence of coatings on the fibers. The anticipated increase in strength, in particular in those areas of the articles where it is demanded, is not realized in view of a lack of reproducibility.

German Pat. No. 1, 936,822 describes a process for manufacturing plastic articles with adjustable mechanical properties, by embedding particles of polytetrafluoroethylene (PTFE) in the plastic material. This process suffers shortcomings because a required complete and even distribution of the PTFE particles in the mass of plastic material is difficult to realize so that the surface of the article being made as well as any random interface are uniformly infiltrated. The reason for this difficulty resides in the comparably small viscosity of the melted plastics mass so that PTFE particles, which have a high specific weight, descend fairly rapidly in the melted plastics mass and accumulate in one spot. Attempts to solve this problem include the admixture of particles of a thermoplastic plastic to the particles of PTFE in a preliminary stage such that the mixture, when the plastic is melted, has the density of the pourable polymer. Equalizing the difference in density prevents a demixing as a result of descending PTFE particles in the pourable polymer. After cooling down, the mixture of plastic and PTFE particles is granulated, and the granulate is blended to the pourable polymer in accordance with the desired mechanical properties.

It is known to add PTFE purely for tribological reasons to positively influence the friction and wear behavior. The addition of PTFE results, however, in all cases to a decrease of the strength. This is true even when using a different plastic material as intermediate carrier for the PTFE particles. Adjustment of desired mechanical properties is therefore unattainable through addition of PTFE.

In a further example, German Pat. No. 1, 936,822 describes a method in which a first layer has begun to polymerize in a mold. Subsequently, a layer, e.g. a fiberglass mat, is placed in the mold before the next layer is poured. The placement of fiberglass as intermediate layer cannot be realized without using fastening members because the own weight of the layer of fiberglass and the mass flow of the next layer will otherwise drag the fiberglass layer downwards. Thus, the fastening members are incorporated in the material during polymerization, thereby complicating the process and significantly adversely affecting the quality of the finished product.

SUMMARY OF THE INVENTION

It is thus an object of the present invention to provide an improved process for manufacturing rotationally symmetrical articles, such as rope pulleys, running wheels or the like, from plastic material, obviating the afore-stated drawbacks.

In particular, it is an object of the present invention to provide an improved process for manufacturing rotationally symmetrical articles from plastic material, such as polyamides, which is simple in structure and yet reliable in operation to realize a reproducible increase in strength in selected regions.

These objects, and others which will become apparent hereinafter, are attained in accordance with the present invention by preparing first and second lactam melts of such formulations and composition as to exhibit different mechanical properties, and pouring the first and second melts sequentially into a mold in dependence on the course of polymerization, without interruption of a rotating motion of the mold.

According to another feature of the present invention, filler and/or reinforcing agents are added to the first and second melts. Examples of such filler and/or reinforcing agents include fiberglass, plastic fibers, aramide fibers and natural fibers, laminar talcum, silane-treated wollastonite, talc pellets etc. or glass balls. The addition of such filler and/or reinforcing agents in conjunction with the variation of lactams, activators, catalysts, crystallization accelerators etc. realizes a significantly increased and targeted influence of material and structure with respect to modulus of elasticity, tensile strength, absorption capability etc. A targeted reinforcement of, e.g., the hub area can be accomplished by preparing through admixture of catalysts and activator a defined first ε-caprolactam melt at an amount which corresponds to the volume of the article as defined from the outer article edge in radially inward direction to the hub area, pouring the melt into a rotating heated mold, and subsequently stopping the pouring while maintaining a rotation of the mold. At the moment of commencement of polymerization of the melt in the mold, a second ε-caprolactam melt, mixed with catalyst and activator as well as reinforcing agents such as glass balls or glass fibers, is poured into the mold for formation of the hub area, whereby this second ε-caprolactam melt has increased strength properties in the final stage in comparison to the first ε-caprolactam melt.

As a commencing of the polymerization process in the mold is accompanied by a steady increase in viscosity of the lactam melt, a pouring of additional lactam melt results in an intimate and even bond of both melts in the contact area; However, a thorough mixing of both lactam melts is prevented by this procedure. After completed polymerization, the cast article is removed from the mold and mechanically re-dressed in a manner known per se.

According to another feature of the present invention, an increase in strength in selected areas is also possible by placing one or more strength-enhancing and stiffness-enhancing elements in the cast mold before the casting process to form with the added raw material melts a form-fitting and/or force-fitting or cross-linked composite. Suitably, an insert of metal is used which has a degree of strength at least corresponding or exceeding the strength of the reinforced raw material melt. An intimate bond can be realized when roughening the surface of the insert and/or forming the inserts with impressions, grooves or breakthroughs such as slots or bores. A suitable material for the insert includes aluminum or an aluminum alloy because the specific weight is low and the strength is high in comparison with plastic material.

The process according to the present invention is applicable for all types of rotationally symmetrical articles which have annular volume parts of varying strength. Not only can the hub area be reinforced by the process according to the present invention, but also the edge area of the article, e.g. the area of the groove for the rope, i.e. an area that is also subject to substantial loads, can be reinforced by this novel and inventive process.

Through the process according to the present invention, the advantages of using plastic material for manufacturing rotationally symmetrical articles, in particular the low weight and the superior pressure behavior and wear behavior are retained while eliminating the drawbacks, experienced heretofore, in the hub and bearing zone which is subject to substantial loads. In addition, the novel and inventive process, involved here, allows an incorporation of layers of varying materials, e.g. for sandwich panels or the like, when articles or semi-finished products are cast without pressure.

BRIEF DESCRIPTION OF THE DRAWING

The above and other objects, features and advantages of the present invention will be more readily apparent upon reading the following description of preferred exemplified embodiments of the invention with reference to the accompanying drawing, in which.

DETAILED DESCRIPTION OF PREFERRED EMBODIMENTS

Figure 1:
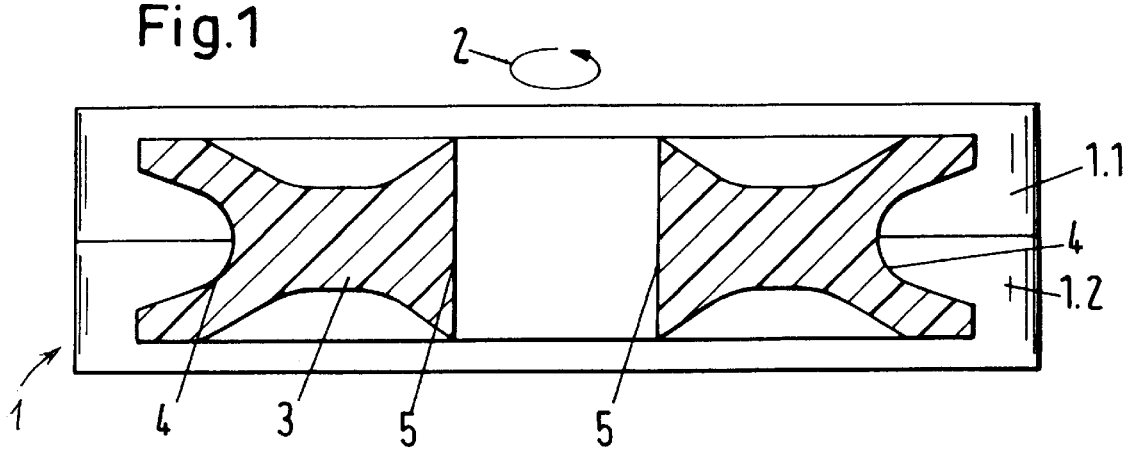
FIG. 1 is a first step of a process in accordance with the present invention for manufacturing a first variation of a rope pulley.

Throughout all the Figures, same or corresponding elements are generally indicated by same reference numerals.

Figure 2:
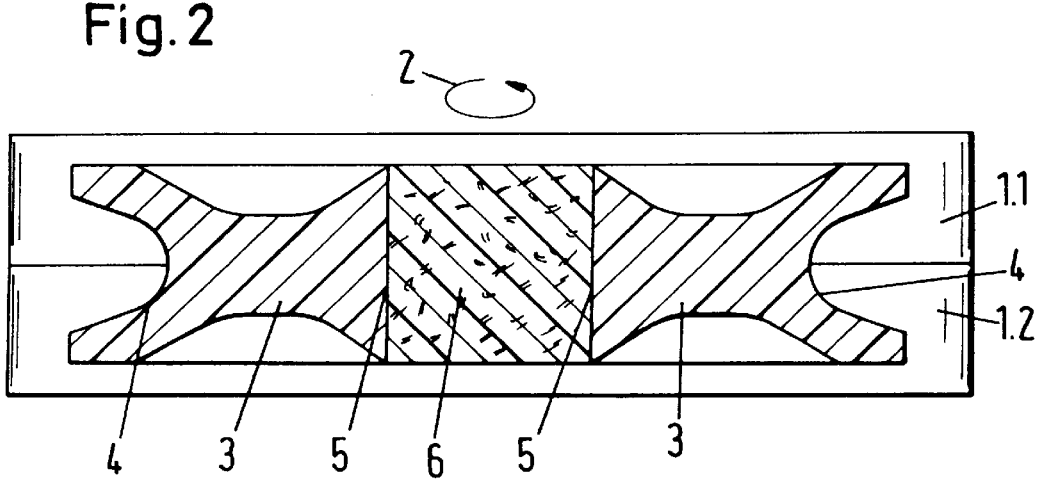
FIG. 2 is a second step of the process according to the present invention.
Figure 3:
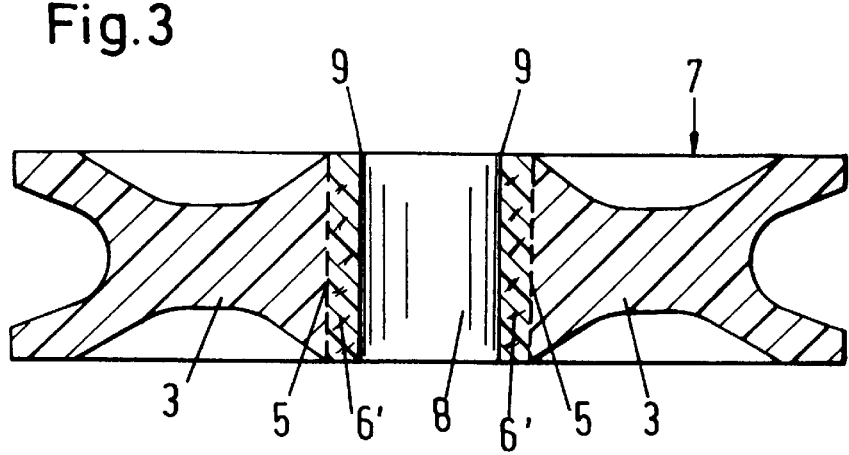
FIG. 3 is a final step of the novel and inventive process.

Turning now to the drawing, and in particular to FIGS. 1 to 3, there are shown essential process steps for manufacturing a rope pulley in accordance with a first embodiment of the present invention. FIG. 1 shows a first process step in which a defined amount of ε-caprolactam melt 3, containing catalyst and activator, is poured into a mold 1, e.g. a centrifugal casting mold, shown only schematically and including mold halves 1.1 and 1.2. It will be appreciated by persons skilled in the art that catalysts and activators are generally known to the artisan and can vary to a wide degree to best suit the formulation and composition of the melts, involved here, to a desired application. However, the selected catalysts and activators are not part of the invention, and therefore are only referred to in general for the sake of simplicity. The mold 1 is heated by suitable heating means (not shown) and rotates during pouring of the melt 3, as indicated by arrow 2. The melt 3 poured into the mold 1 in this phase has a volume that corresponds to a radial volume of the finished article being cast, as defined from an outer edge 4 radially inwardly to just about a zone 5 where the hub area of the finished article commences. When the proper amount of melt 3 is poured into the mold 1, the pouring action is stopped while rotation of the mold 1 continuous. Polymerization of the melt 3 now sets in. As soon as the entire volume of the melt 3 has polymerized, a second ε-caprolactam melt 6, admixed with catalyst, activator and in addition with filler and/or reinforcing agents, is poured into the mold 1 to establish the hub area, as shown in FIG. 2. Examples of such filler and/or reinforcing agents include fiberglass, plastic fibers, aramide fibers and natural fibers, laminar talcum, silane-treated wollastonite, talc pellets etc. or glass balls. As the viscosity of a lactam melt continuously increases during progressing polymerization, a pouring of the second melt 6 onto the first melt 3 results in an intimate and homogenous bonding only in the interface areas of the melts 3, 6, whereas a thorough mixture of the lactam melts 3, 6 is prevented. Thus, the second ε-caprolactam melt 6 exhibits increased mechanical strength after complete polymerization.

The process steps, as described in conjunction with FIGS. 1 and 2 result in an intended reinforcement of the hub area. FIG. 3 illustrates the finished product, i.e. rope pulley 7, after removal from the mold 1 and following a mechanical refinishing. In order to receive a bearing (not shown), a bore 8 is so provided in the polymerized reinforced ε-caprolactam melt 6 as to form an outer shell 6' of a desired thickness and greater strength. The area of the shell 6' is thus better equipped to absorb high surface pressure acting in the bearing seat., and thus prevents a yielding in particular in the edge region 9.

Figure 4:
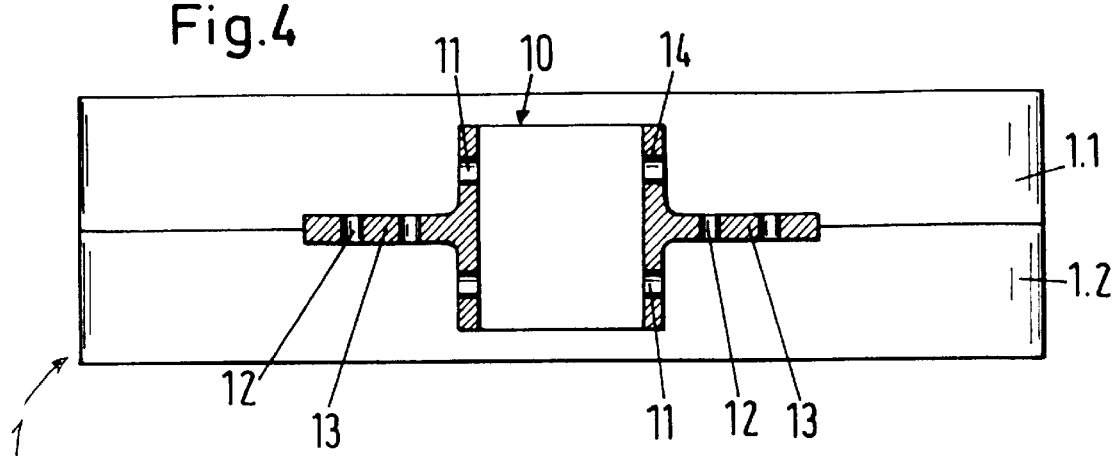
FIG. 4 is a first step of a process in accordance with the present invention for manufacturing a second variation of a rope pulley.

Turning now to FIGS. 4 to 7, there are shown essential process steps for manufacturing a rope pulley in accordance with a second embodiment of the present invention. Parts corresponding with those in FIGS. 1 to 3 are denoted by identical reference numerals. FIG. 4 shows a first process step in which an insert 10, preferably made of metal, e.g. aluminum or aluminum alloy, is placed in the mold 1 to reinforce the hub area. The insert 10 is provided with a plurality of breakthroughs 11, 12 in the form of bores, to realize an intimate bond between the insert 10 and melt subsequently poured into the mold 1. Optionally, the surface of the insert 10 may be roughened and/or formed with superficial depressions or grooves to realize an intimate bond of the insert 10 and melt. With respect to effect an intended reinforcement of the hub area, the insert 10 is formed as cylindrical bushing 14 which includes a disk-like collar 13 extending into the body of the finished product, i.e. rope pulley.

Figure 5:
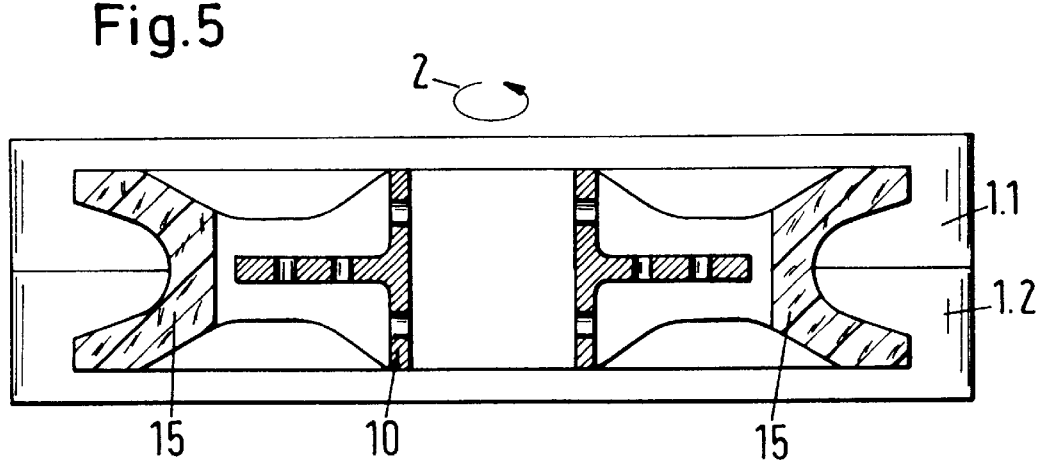
FIG. 5 is a second step of the process of FIG. 4.
Figure 6:
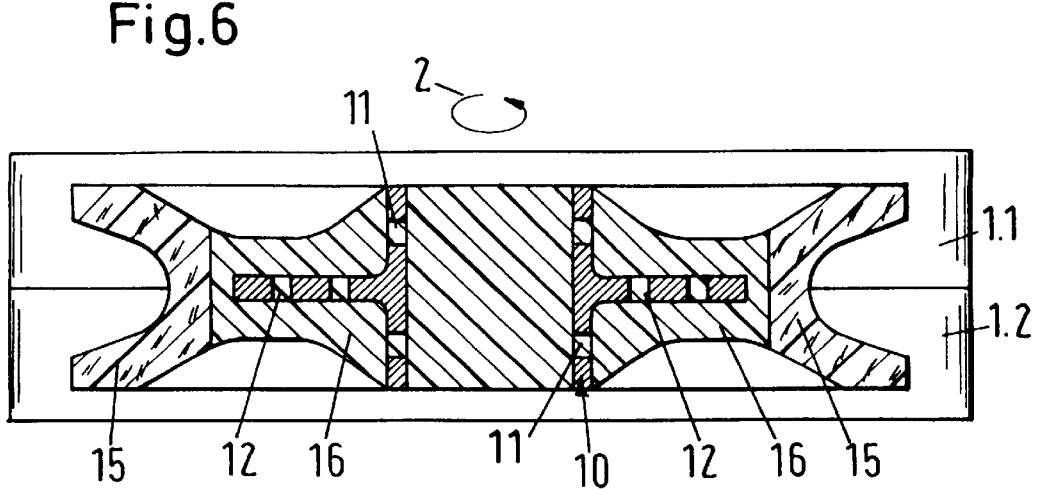
FIG. 6 is a third step of the process of FIG. 4.

After securing the insert 10 in the mold 1, the heated mold 1 is rotated, as indicated by arrow 2. Subsequently, a first ε-caprolactam melt 15 is poured into the mold 1 to fill out a border area of the mold 1. The border area is represented in FIG. 5 by cross-hatching to indicate that the first ε-caprolactam melt 15 is reinforced with reinforcing agents so as to realize a targeted strengthening of the border area of the rope pulley. Suitably, the insert 10 has a strength which is at least equal to or greater than the strength of the ε-caprolactam melt 15. As described above in connection with FIGS. 1 and 2, polymerization of the first ε-caprolactam melt 15 is allowed to commence before pouring a second ε-caprolactam melt 16 which does not contain reinforcing agents and fills the remaining zone from the border area to the hub area, whereby melt 16 migrates into the breakthroughs 11, 12 of the insert 10, as shown in FIG. 6.

Figure 7:
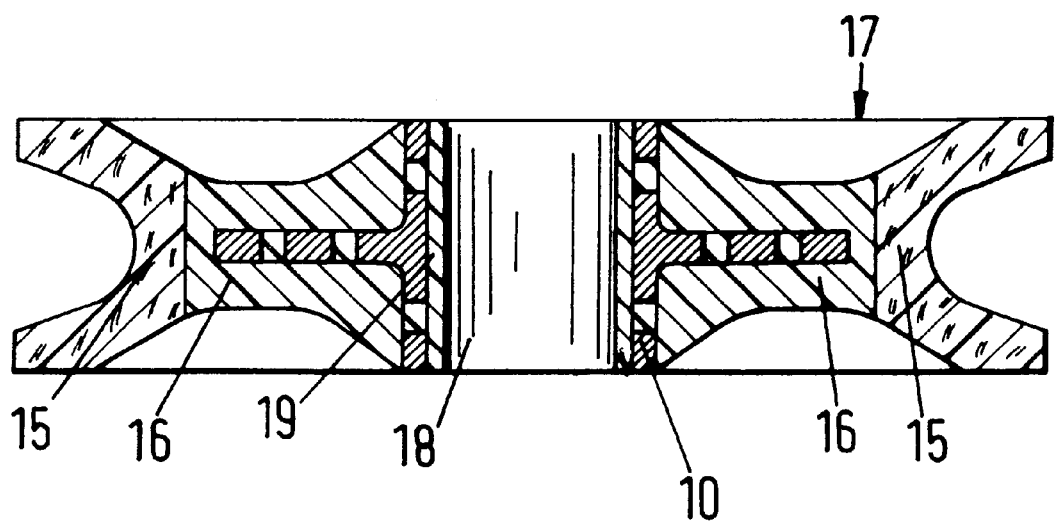
FIG. 7 is a final step of the process of FIG. 4.

FIG. 7 depicts a finished rope pulley 17 after withdrawal from the mold 1 and following a mechanical refinishing procedure. A bore 18 is formed in the hub area for receiving a bearing, thereby leaving an inside lining 19 upon the insert 10. It will be appreciated by persons skilled in the art will understand that it is certainly conceivable to provide a bore in the hub area of such dimensions that the bore is demarcated by the inside surface of the insert 10, without leaving a lining 19.

While the invention has been illustrated and described as embodied in a process of manufacturing rotationally symmetrical articles, it is not intended to be limited to the details shown since various modifications and structural changes may be made without departing in any way from the spirit of the present invention.

What is claimed as new and desired to be protected by letters patent is set forth in the appended claims:

1. A process of making a rotationally symmetrical article from plastic material, comprising the steps of:
    preparing a first lactam melt having a first composition and a second lactam melt having a second composition which is different from the first composition so that the first and second lactam melts exhibit different mechanical strengths after polymerization;
    pouring the first and second lactam melts into a heated mold in succession in dependence on a polymerization pattern of the first and second lactam melts;
    allowing complete polymerization of the first and second lactam melts in the mold to form a finished article; and
    opening the mold and removing the finished article from the mold for optional re-finishing procedure.

2. The process of claim 1, and further comprising the step of admixing at least one material selected from the group consisting of filler agents and reinforcing agents to the melts during the preparing steps.

3. The process of claim 2 wherein the at least one material is a fiber.

4. The process of claim 2 wherein the at least one material is a round body of glass.

5. The process of claim 1, and further comprising the step of placing at least one strength-enhancing and stiffness-enhancing insert into the mold before the pouring step to form with the poured melts a form-fitting bond and/or force-fitting bond or cross-linked bond.

6. The process of claim 5 wherein the insert has a strength at least equal or greater than the reinforced melts.

7. The process of claim 5 wherein the insert is made of metal.

8. The process of claim 5 wherein the insert is made of aluminum or aluminum alloy.

9. The process of claim 5, and further comprising the step of roughening a surface of the insert and/or forming the insert with superficial depressions, grooves or breakthroughs.

10. The process of claim 1 wherein the melts are poured into the mold, without interruption of a rotation of the mold.

11. The process of claim 1 wherein the mold is a rotating, heatable mold, wherein the first lactam melt is a ε-caprolactam melt mixed with catalyst and activator, and poured into the mold at a defined amount, which corresponds to a volume of the article in a zone stretching from a border zone radially inwardly to a hub area of the article, whereby the mold continues to rotate after terminating pouring of the first lactam melt, and wherein the second lactam melt is a ε-caprolactam melt mixed with catalyst, activator and reinforcing agents, and poured into the mold when polymerization of the first lactam melt has commenced, thereby realizing a targeted reinforcement of the hub area.

12. The process of claim 11, and further comprising the step of pouring a third ε-caprolactam melt of increased mechanical strength after polymerization, into the border zone of the article.

13. The process of claim 1, wherein the mold is a rotating, heatable mold, and further comprising the steps of placing before the pouring step a strength-enhancing and stiffness-enhancing insert into the mold for realizing a targeted reinforcement of a hub area of the article, wherein the first lactam melt is a ε-caprolactam melt mixed with reinforcing agents to exhibit enhanced mechanical strength after polymerization and poured into the mold for formation of a border area of the article, whereby the mold continues to rotate after terminating pouring of the first lactam melt, and wherein the second lactam melt is a ε-caprolactam melt mixed with catalyst and activator, and is poured into the mold when polymerization of the first lactam melt has commenced for casting a remaining zone of the article.

14. A centrifugal casting process, comprising the steps of:
    preparing a first lactam melt;
    preparing a second lactam melt of different composition than the first lactam melt so that the first and second lactam melts have after polymerization a different mechanical strengths;
    pouring the first lactam melt into a heated rotating mold;

pouring the second lactam melt into the rotating mold after the first lactam melt has been poured into the mold and during beginning polymerization of the first lactam melt.

15. The process of claim 14 wherein the second lactam melt contains at least one material selected from the group consisting of filler agents and reinforcing agents.

16. The process of claim 15 wherein the at least one material is a fiber or a round body of glass.

17. The process of claim 14, and further comprising the step of placing at least one strength-enhancing and stiffness-enhancing insert into a predetermined zone of the mold for bonding with the first and second lactam melts.

18. The process of claim 17 wherein the insert is made of metal.

19. The process of claim 18 wherein the insert is made of aluminum or aluminum alloy.

20. The process of claim 18 wherein the insert has a roughened surface and/or is formed with superficial depressions, grooves or breakthroughs.

21. The process of claim 14 wherein the lactam melts are poured into the mold, without interruption of a rotation of the mold.

22. The process of claim 14 wherein the first lactam melt is a $\epsilon$-caprolactam melt, mixed with catalyst and activator, and is poured into the mold at a defined amount which corresponds to a volume of a finished in a zone stretching from a border zone radially inwardly to a hub area of the article, and the second lactam melt is a $\epsilon$-caprolactam, containing reinforcing agents so as to impart a strength, when the second lactam melt is polymerized, which strength exceeds a strength of the first lactam melt, when the first lactam melt is polymerized, thereby realizing a targeted reinforcement of the hub area.

23. The process of claim 17, wherein the first lactam melt is a $\epsilon$-caprolactam melt, mixed with reinforcing agents and is poured into the mold for formation of a border area of a finished article, and wherein the second lactam melt includes is a $\epsilon$-caprolactam, having a mechanical strength smaller than a mechanical strength of the first lactam melt, and is poured into the mold when polymerization of the first lactam melt has commenced for casting a remaining zone of the article.

* * * * *